United States Patent [19]
Sainsbury

[11] Patent Number: 5,263,253
[45] Date of Patent: Nov. 23, 1993

[54] COMPOST PROCESSING TOOL

[75] Inventor: J. Douglas Sainsbury, Unionville, Canada

[73] Assignee: Barclay Recycling Inc., Toronto, Canada

[21] Appl. No.: 700,403

[22] Filed: May 15, 1991

[51] Int. Cl.$^5$ ............................ A01B 1/00; B26B 3/00
[52] U.S. Cl. .......................................... 30/169; 30/123; 30/340; 47/1.01; 294/49; 294/51; 294/57
[58] Field of Search ................. 30/169, 171, 172, 123, 30/142, 340, 342; 47/1.01, 9; 294/19.1, 49, 51, 57, 58

[56] References Cited
U.S. PATENT DOCUMENTS
2,796,011  6/1957  Schmidt .......................... 47/1.01 X Primary Examiner—Douglas D. Watts

[57] ABSTRACT

The present invention is directed to a compost processing tool having a blade at one end thereof suitable for chopping, cutting and turning compost. The tool also includes a hollow shaft extending from the blade with the shaft having a host of openings through a wall of the shaft with the holes spaced in the length of the shaft. This hollow shaft may be used to provide a lever for the blade used during chopping, cutting and turning of the compost and the shaft also serves as a breather tube when placed in a volume of compost with the shaft partially buried in the compost.

8 Claims, 2 Drawing Sheets

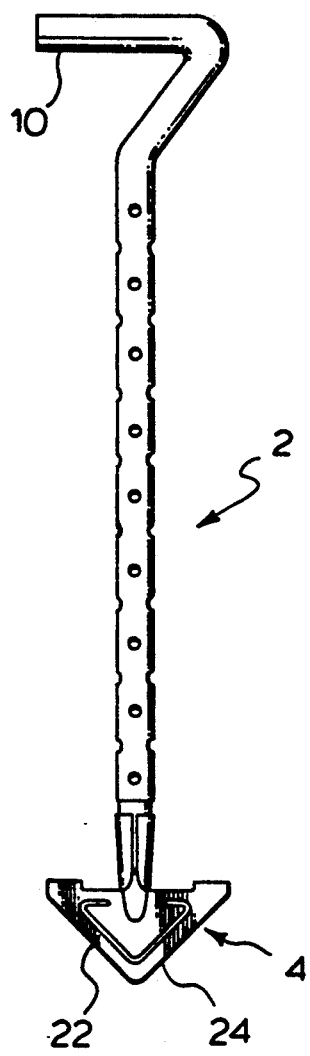
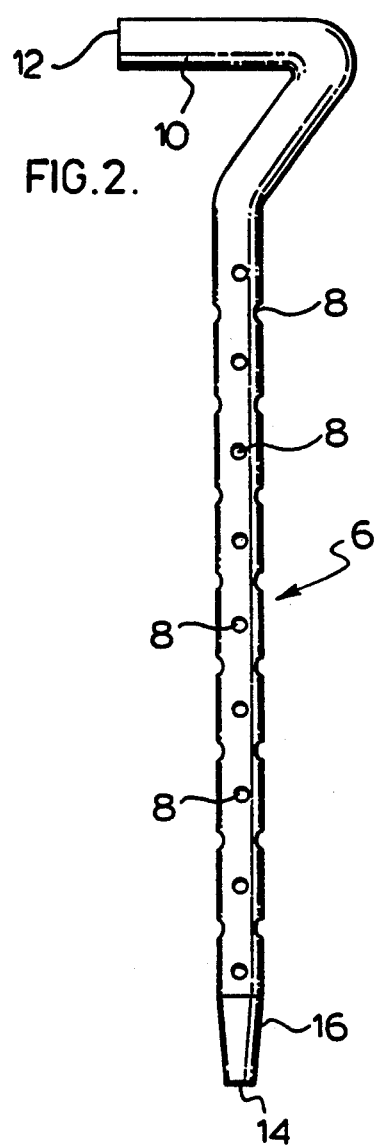
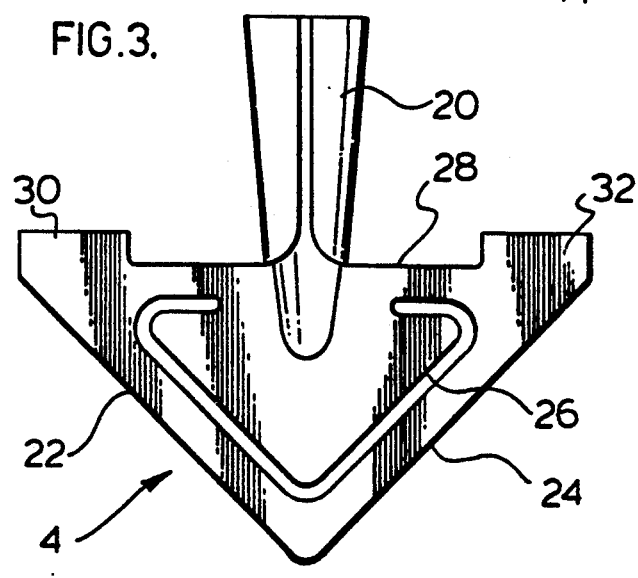

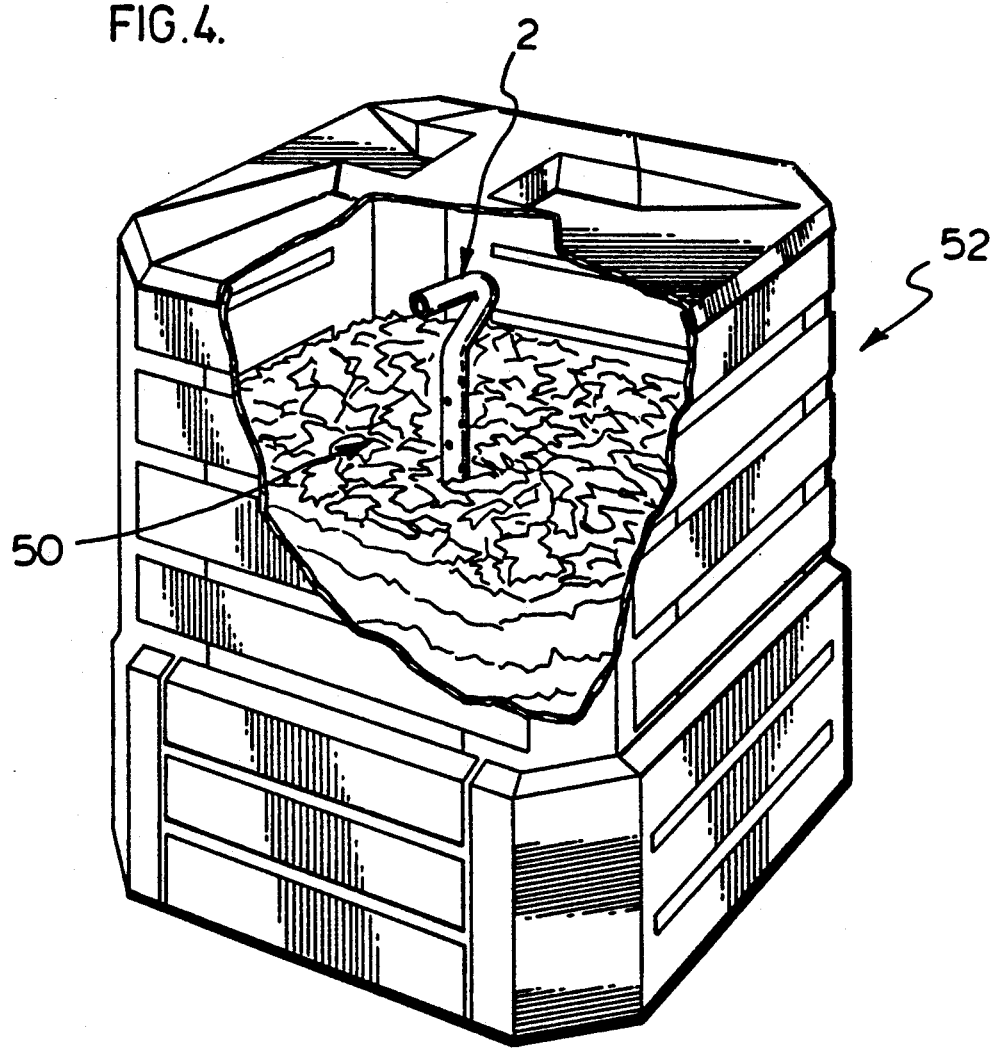

COMPOST PROCESSING TOOL

FIELD OF THE INVENTION

The present invention is related to tools used in association with composting. In particular, the invention relates to a compost processing tool which is effective in processing of the compost and also providing air to the compost.

BACKGROUND OF THE INVENTION

A great deal of emphasis has recently been placed on composting of certain food and lawn waste products and, in particular, composting as a way to reduce the amount of household garbage. Composting, per se, has been carried out for years, initially with merely a compost pile which was open to the environment and, more lately, by the use of compost containers. Compost containers are used to improve the rate of composting and to provide a more suitable environment for composting. These compost bins are also more aesthetically appealing. One such compost bin is shown in U.S. Design Pat. No. D263,365.

Although the compost bins improve the efficiency and the rate of composting, the user can also improve the performance of the compost bin by effectively chopping of the material into smaller segments which are converted more rapidly. Furthermore, the user can effectively turn the compost allowing efficient aeration of the compost which normally will also improve the rate. One of the problems with composting is the need to supply air to the interior of the compost pile to allow conversion. There remains a need to provide a simple arrangement to assist the user in effectively processing the compost.

SUMMARY OF THE INVENTION

The compost processing tool, according to the present invention, comprises a blade suitable for chopping, cutting and turning of compost in combination with a hollow shaft extending from the blade with the shaft having a host of openings through a wall thereof with the holes spaced in the length of the shaft. The hollow shaft may be used to provide a lever for the blade used during chopping, cutting and turning of the compost, with the shaft also serving as a breather tube when placed in a volume of compost with the shaft partially buried in the volume of compost.

According to an aspect of the invention, the hollow shaft includes a handle portion at an end of the hollow shaft remote the blade.

According to yet a further aspect of the invention, the compost processing tool has the handle portion integral with the shaft.

According to a further aspect of the invention, the shaft could either be made out of steel tube or reinforced plastic that is manufactured by means of a molding process.

According to yet a further aspect of the invention, the compost processing tool includes a triangular-like blade with two edges of the triangular section being cutting edges and the third edge of said blade comprises two flaps bent in opposite directions. The purpose of these flaps are to aid in the churning of the compost pile. By inserting the compost processing tool into the compost pile, rotating 90° and removing, the compost catches on these flaps and is drawn to the surface. In addition, these flaps could be used as a foot drivable edge.

BRIEF DESCRIPTION OF THE DRAWINGS

Preferred embodiments of the invention are shown in the drawings, wherein:

FIG. 1 is a view of the compost processing tool illustrating the handle and blade in a connected manner;

FIG. 2 is a view of the processing handle alone;

FIG. 3 is a front view of the aeration blade; and

FIG. 4 is a perspective view of the processing tool partially buried in a volume of compost.

DETAILED DESCRIPTION OF THE PREFERRED EMBODIMENTS

The compost processing tool, generally shown as 2 in FIG. 1, has a triangular blade 4 at one end of the hollow shaft 6. Along the length of the hollow shaft 6 is a host of holes or ports shown as circular ports each having a diameter of about ¼ inch. These holes or ports are divided into longitudinal strips and pass through a wall section of the hollow shaft and open onto the center cavity of the hollow shaft. The holes of adjacent strips are offset in the length of the hollow handle to improve the structural integrity of the hollow shaft. At the end of the shaft remote the blade 4 is an integral handle 10. This handle has an open end 12 whereby air can pass through the hollow shaft and pass through the host of holes or ports 8. The hollow shaft is also open at the end 14 of the tapered blade engaging 16 of the hollow shaft 6. Tapered blade engaging end 16 cooperates with the tapered handle receiving slot 20 of the blade 4.

The blade 4 includes cutting edges 22 and 24 with parallel reinforcing ribs 26 provided in the blade to strengthen the blade when edges 22 and 24 are used. The triangular shaped blade also includes a foot driving edge, generally shown as 28. At either end of the foot driving blade is a bent flange 30 or 32 which preferably are oppositely bent. These flanges 30 and 32 reinforce the driving edge and also allow a foot to easily engage the driving edge 28.

The compost processing tool 2 can be effectively used for chopping of composting material, turning over of compost material within a compost bin, as well as allowing for convenient removal of material from the base of a compost bin. The small blade provided at one end of the processing tool makes vertical chopping by forcing the tool downwardly in a compost bin effective without an undue amount of force, which may be difficult to impart to the shaft as the user is standing to one side of the bin.

As it is important to provide aeration of the material 50 in the compost bin 52 and the user may, on occasion, drive the processing tool 2 into a pile of compost 50, rotate the tool and then vertically withdraw the tool. In this manner, the slot through which the blade has forced its way through the compost is spaced and a volume of compost will be lifted with the shaft, thus effectively aerating the compost.

When the compost processing tool 2 is not in use, it may be stored within the compost bin 52 by forcing of the tool into the compost 50, such that the compost effectively supports the tool as illustrated in FIG. 4. In addition, the handle 4, which is hollow and has the various ports 8 provided in length thereof, introduces air into the compost 50 or allows the interchange of air with the compost adjacent the hollow shaft. Air can pass through open port 12 and enter the compost through any of the ports 8 or even through the open end 14. When centrally placed in a compost pile with a portion of the handle above the compost, effective air exchange can be accomplished. Thus, the tool, when stored in the compost 50, acts as a breather tube for more efficient composting. Composting and effective composting does require a certain temperature to allow the process to start as well as proper moisture mixture and air content. The storage of the compost tool in a compost pile allows more effective composting even if the user does not constantly aerate the composting material by turning the same over. At least the material generally adjacent the hollow handle will have sufficient air to allow the process to continue.

Any compost which becomes accumulated within the handle can be flushed therefrom by forcing water through the handle.

This compost tool is particularly useful in association with the compost bin generally shown in U.S. Design Pat. No. D263,365. The tool, because of its generally flat blade configuration, is very useful for allowing removal of compost from the bottom access doors of the compost bin. The bent flanges also allow convenient removal by inserting the blade and turning the same a few degrees so that the compost material catches on these flanges during removal of the compost tool from the access doors.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A compost processing tool comprising a blade and a tubular shaft, said blade being suitable for chopping, cutting and turning compost; said shaft having one end secured to said blade with the other end of said shaft being bent approximately perpendicular to a longitudinal axis of the shaft to form a handle portion; said shaft having a host of openings through a wall of said shaft sized to promote the free exchange of air into and out of the tubular shaft with the host of openings being spaced in the length of said shaft; said shaft at a free end of said handle portion having a large opening into the interior of the tubular shaft, said tubular shaft defining a hollow passageway between said large opening at said free end of said handle portion and said host of openings to promote air exchange therebetween, said tubular shaft defining a lever for said blade used during chopping, cutting and turning of compost and defining a breather tube which, when placed in a volume of compost with said shaft partially buried in the volume of the compost allows air to freely flow into or out of said tubular shaft through the opening at said handle portion and through said host of holes in the walls of the tubular shaft to the compost thereby improving the amount of air available for decomposing of the compost.

2. A compost processing tool as claimed in claim 1 wherein said blade includes a triangular section with two edges of the triangular section being cutting edges and the third edge of said blade being a foot drivable edge.

3. A compost processing tool as claimed in claim 1 wherein said openings through a wall of the shaft are divided into longitudinal groups spaced about the shaft with the openings of adjacent groups offset in the length of said shaft.

4. A compost processing tool as claimed in claim 1 wherein each opening of said host of openings is about $\frac{1}{4}$ of an inch in diameter.

5. A compost processing tool as claimed in claim 1 wherein said shaft is made of tubular steel.

6. A compost processing tool as claimed in claim 1 wherein said tubular shaft is hollow throughout its length.

7. A compost processing tool as claimed in claim 1 wherein said tubular shaft is hollow throughout its length and is open at said one end thereof connected to said blade.

8. A compost processing tool comprising a blade connected to an end of a tubular shaft, said tubular shaft being hollow throughout its length and having large openings at either end thereof through which air can freely enter or leave said hollow shaft, sad shaft having a host of air exchange openings sized to promote the free air exchange into and out of the hollow shaft intermediate the length of said shaft with the host of openings being spaced int he length of said shaft; said hollow tubular shaft serving to define a conduit interior to said shaft which connects said host of openings with said large openings either end whereby air can flow and be exchanged between said large openings and said host of air exchange openings via said tubular shaft; said shaft intermediate said host of air exchange openings and an end of said shaft remote said blade being bent to form a hand grip portion.

* * * * *